US010965631B2

(12) United States Patent
Daptardar et al.

(10) Patent No.: US 10,965,631 B2
(45) Date of Patent: Mar. 30, 2021

(54) ACTIVITY-RELATED RELEVANCE PROCESSING OF ELECTRONIC MESSAGE(S)

(71) Applicant: INTERNATIONAL BUSINESS MACHINES CORPORATION, Armonk, NY (US)

(72) Inventors: Kedar J. Daptardar, Naugatuck, CT (US); Craig M. Trim, Ventura, CA (US); Aaron K. Baughman, Cary, NC (US); Natalie Brooks Powell, Bolingbrook, IL (US); Michael Bender, Rye Brook, NY (US); Tamer M. Nassar, Fairfield, CT (US); Nader M. Nassar, Yorktown Heights, NY (US); Murali Vridhachalam, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/411,557

(22) Filed: May 14, 2019

(65) Prior Publication Data

US 2020/0366632 A1    Nov. 19, 2020

(51) Int. Cl.
*H04L 12/58* (2006.01)
*H04L 29/08* (2006.01)
*G06F 40/30* (2020.01)

(52) U.S. Cl.
CPC .............. *H04L 51/12* (2013.01); *G06F 40/30* (2020.01); *H04L 51/04* (2013.01); *H04L 51/18* (2013.01); *H04L 51/24* (2013.01); *H04L 67/22* (2013.01)

(58) Field of Classification Search
CPC ......... H04L 51/12; H04L 51/24; H04L 67/22; H04L 51/04; H04L 51/18; G06F 40/30
See application file for complete search history.

(56) References Cited

U.S. PATENT DOCUMENTS

2011/0055369 A1    3/2011  Oh et al.
2012/0311045 A1*   12/2012 Sylvain .................. H04L 51/12
                                                                709/206
(Continued)

OTHER PUBLICATIONS

Mel et al., "The NIST Definition of Cloud Computing," National Institute of Standards and Technology, Information Technology Laboratory, Special Publication 800-145, Sep. 2011 (pp. 1-7).

(Continued)

*Primary Examiner* — Caroline H Jahnige
(74) *Attorney, Agent, or Firm* — Michael A. Petrocelli, Esq.; Kevin P. Radigan, Esq.; Heslin Rothenberg Farley & Mesiti P.C.

(57) ABSTRACT

Activity-related relevance processing of an electronic message includes receiving, by a processor(s) user-related data indicative of a current activity of a user, and parsing, by the processor(s), content of the electronic message for an electronic device of the user. The parsing includes using natural language processing of the electronic message. An activity-related relevance of the electronic message to the user is determined, by the processor(s), based on the user-related data and the parsed content of the electronic message. Based at least in part on the determined activity-related relevance, the electronic message is processed for the user's electronic device.

17 Claims, 12 Drawing Sheets

(56) References Cited

U.S. PATENT DOCUMENTS

| | | | |
|---|---|---|---|
| 2014/0253319 A1* | 9/2014 | Chang | H04M 1/72522 |
| | | | 340/521 |
| 2016/0197865 A1 | 7/2016 | Kim | |
| 2017/0063750 A1* | 3/2017 | Vardhan | H04W 12/005 |
| 2017/0206120 A1 | 7/2017 | Yi et al. | |
| 2018/0167349 A1 | 6/2018 | James et al. | |
| 2019/0007546 A1* | 1/2019 | Anderson | H04M 1/72563 |

OTHER PUBLICATIONS

Corno et al., "A Context and User Aware Smart Notification System", IEEE 2nd World Forum on Internet of Things (WF-IoT), Milon, Italy, Dec. 2015 (6 pages).

A. Friedlein, "Smart Notifications: The Next Evolution of Messaging", https://blog.ably.io/smart-notifications-the-next-evolution-of-messaging-6dcb24bf857, published Oct. 11, 2016, downloaded Apr. 9, 2019 (8 pages).

* cited by examiner

RECEIVING, BY ONE OR MORE PROCESSORS, USER-RELATED DATA INDICATIVE OF A CURRENT ACTIVITY OF A USER ~600

PARSING, BY THE ONE OR MORE PROCESSORS, CONTENT OF AN ELECTRONIC MESSAGE FOR AN ELECTRONIC DEVICE OF THE USER, THE PARSING USING NATURAL LANGUAGE PROCESSING OF THE ELECTRONIC MESSAGE ~602

DETERMINING, BY THE ONE OR MORE PROCESSORS, AN ACTIVITY-RELATED RELEVANCE OF THE ELECTRONIC MESSAGE TO THE USER BASED ON THE USER-RELATED DATA AND THE PARSED CONTENT OF THE ELECTRONIC MESSAGE ~604

BASED AT LEAST IN PART ON THE DETERMINED ACTIVITY-RELATED RELEVANCE, PROCESSING THE ELECTRONIC MESSAGE FOR THE USER'S ELECTRONIC DEVICE ~606

WHERE THE PROCESSING THE ELECTRONIC MESSAGE INCLUDES DETERMINING WHETHER TO FILTER OUT THE ELECTRONIC MESSAGE FOR THE USER'S ELECTRONIC DEVICE OR MODIFY THE ELECTRONIC MESSAGE FOR THE USER'S ELECTRONIC DEVICE BASED ON THE ACTIVITY-RELATED RELEVANCE ~608

WHERE THE ELECTRONIC MESSAGE INCLUDES AN AUTOMATED ELECTRONIC NOTIFICATION, WITH THE USER BEING REGISTERED TO RECEIVE THE AUTOMATED ELECTRONIC NOTIFICATION ON THE USER'S ELECTRONIC DEVICE ~610

WHERE PROCESSING THE ELECTRONIC MESSAGE FOR THE USER'S ELECTRONIC DEVICE INCLUDES FILTERING OUT THE ELECTRONIC MESSAGE FROM THE USER'S ELECTRONIC DEVICE WHERE, BASED ON THE USER-RELATED DATA INDICATIVE OF THE USER'S CURRENT ACTIVITY AND THE PARSED CONTENT OF THE ELECTRONIC MESSAGE, THE ELECTRONIC MESSAGE IS CONSIDERED SUPERFLUOUS TO THE USER ~612

WHERE FILTERING OUT THE ELECTRONIC MESSAGE FROM THE USER'S ELECTRONIC DEVICE INCLUDES MODIFYING A ROUTING LIST FOR THE ELECTRONIC MESSAGE SO THAT THE USER'S ELECTRONIC DEVICE DOES NOT RECEIVE THE ELECTRONIC MESSAGE ~614

FIG. 6A

WHERE DETERMINING THE ACTIVITY-RELATED RELEVANCE OF THE ELECTRONIC MESSAGE INCLUDES GENERATING A CONFIDENCE LEVEL THAT THE CONTENT OF THE ELECTRONIC MESSAGE IS SUPERFLUOUS TO THE USER BASED ON THE USER-RELATED DATA INDICATIVE OF THE USER'S CURRENT ACTIVITY, AND DETERMINING WHETHER THE CONFIDENCE LEVEL EXCEEDS A CONFIDENCE THRESHOLD ~616

WHERE BASED ON THE CONFIDENCE LEVEL EXCEEDING THE CONFIDENCE THRESHOLD, THE PROCESSING THE ELECTRONIC MESSAGE FOR THE USER'S ELECTRONIC DEVICE FURTHER INCLUDES DETERMINING THAT THE CONTENT OF THE ELECTRONIC MESSAGE IS SUPERFLUOUS INFORMATION RELATED TO THE USER ACTIVITY, AND BASED THEREON, THE PROCESSING THE ELECTRONIC MESSAGE INCLUDES FILTERING OUT THE ELECTRONIC MESSAGE FROM THE USER'S ELECTRONIC DEVICE ~618

WHERE BASED ON THE CONFIDENCE LEVEL EXCEEDING THE CONFIDENCE THRESHOLD, THE PROCESSING THE ELECTRONIC MESSAGE FOR THE USER'S ELECTRONIC DEVICE FURTHER INCLUDES DETERMINING THAT THE CONTENT OF THE ELECTRONIC MESSAGE IS NON-SUPERFLUOUS INFORMATION TO THE USER'S CURRENT ACTIVITY, AND BASED THEREON, THE PROCESSING THE ELECTRONIC MESSAGE INCLUDES PROVIDING THE ELECTRONIC MESSAGE TO THE USER'S ELECTRONIC DEVICE UNMODIFIED ~620

WHERE BASED ON THE CONFIDENCE LEVEL EXCEEDING THE CONFIDENCE THRESHOLD, THE PROCESSING THE ELECTRONIC MESSAGE FOR THE USER'S ELECTRONIC DEVICE FURTHER INCLUDES DETERMINING THAT THE CONTENT OF THE ELECTRONIC MESSAGE IS RELATED AND NON-SUPERFLUOUS INFORMATION TO THE USER'S CURRENT ACTIVITY, AND BASED THEREON, THE PROCESSING THE ELECTRONIC MESSAGE INCLUDES MODIFYING THE ELECTRONIC MESSAGE AND PROVIDING THE MODIFIED ELECTRONIC MESSAGE TO THE USER'S ELECTRONIC DEVICE ~622

ALLOWING THE USER TO PRECONFIGURE THE PROCESSING OF THE ELECTRONIC MESSAGE FOR THE USER'S ELECTRONIC DEVICE BY SETTING THE PROCESSING TO FILTER OUT THE ELECTRONIC MESSAGE BASED ON THE CONFIDENCE LEVEL EXCEEDING A CONFIDENCE THRESHOLD, OR TO MODIFY THE ELECTRONIC MESSAGE BASED ON THE CONFIDENCE LEVEL EXCEEDING THE CONFIDENCE THRESHOLD, WHERE THE MODIFYING INCLUDES TRUNCATING THE CONTENT OF THE ELECTRONIC MESSAGE FOR DISPLAY ON THE USER'S ELECTRONIC DEVICE ~624

FIG. 6B

ACTIVITY-RELATED RELEVANCE PROCESSING OF ELECTRONIC MESSAGE(S)

BACKGROUND

In the information technology field, automated electronic messages or notifications are often provided to an individual's electronic device using a notification system which includes a combination of both software and hardware products. Such an electronic message can be delivered over a variety of computer networks and cellular networks, and can include, an instant message, a personal message, a text message, an e-mail message, an audio message, etc.

Automated electronic messages can be generated and provided to a large number of electronic devices by a variety of providers. For instance, an individual might register with a service or provider to receive automated electronic message updates or notifications on a variety of subjects, such as sports scores, traffic conditions, order status, workflow requests, etc.

SUMMARY

Certain shortcomings of the prior art are overcome and additional advantages are provided through the provision herein of a computer-implemented method, which includes receiving, by one or more processors, user-related data indicative of a current activity of a user, and parsing, by the one or more processors, content of an electronic message for an electronic device of the user. The parsing uses natural language processing of the electronic message, and the method further includes determining, by the one or more processors, an activity-related relevance of the electronic message to the user based on the user-related data and the parsed content of the electronic message. Based at least in part on the determined activity-related relevance, the electronic message is processed for the user's electronic device.

Computer systems and computer program products relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 6A-6B depict a further embodiment of activity-related relevance processing of an electronic message, in accordance with one or more aspects of the present invention;

DETAILED DESCRIPTION

Aspects of the present invention and certain features, advantages and details thereof, are explained more fully below with reference to the non-limiting example(s) illustrated in the accompanying drawings. Descriptions of well-known materials, systems, devices, processing techniques, etc., are omitted so as to not unnecessarily obscure the invention in detail. It should be understood, however, that the detailed description and the specific example(s), while indicating aspects of the invention, are given by way of illustration only, and are not by way of limitation. Various substitutions, modifications, additions, and/or arrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired for a particular application to implement, for instance, a cognitive message processing facility with activity-related relevance processing of an electronic message, such as disclosed herein.

Figure 7:
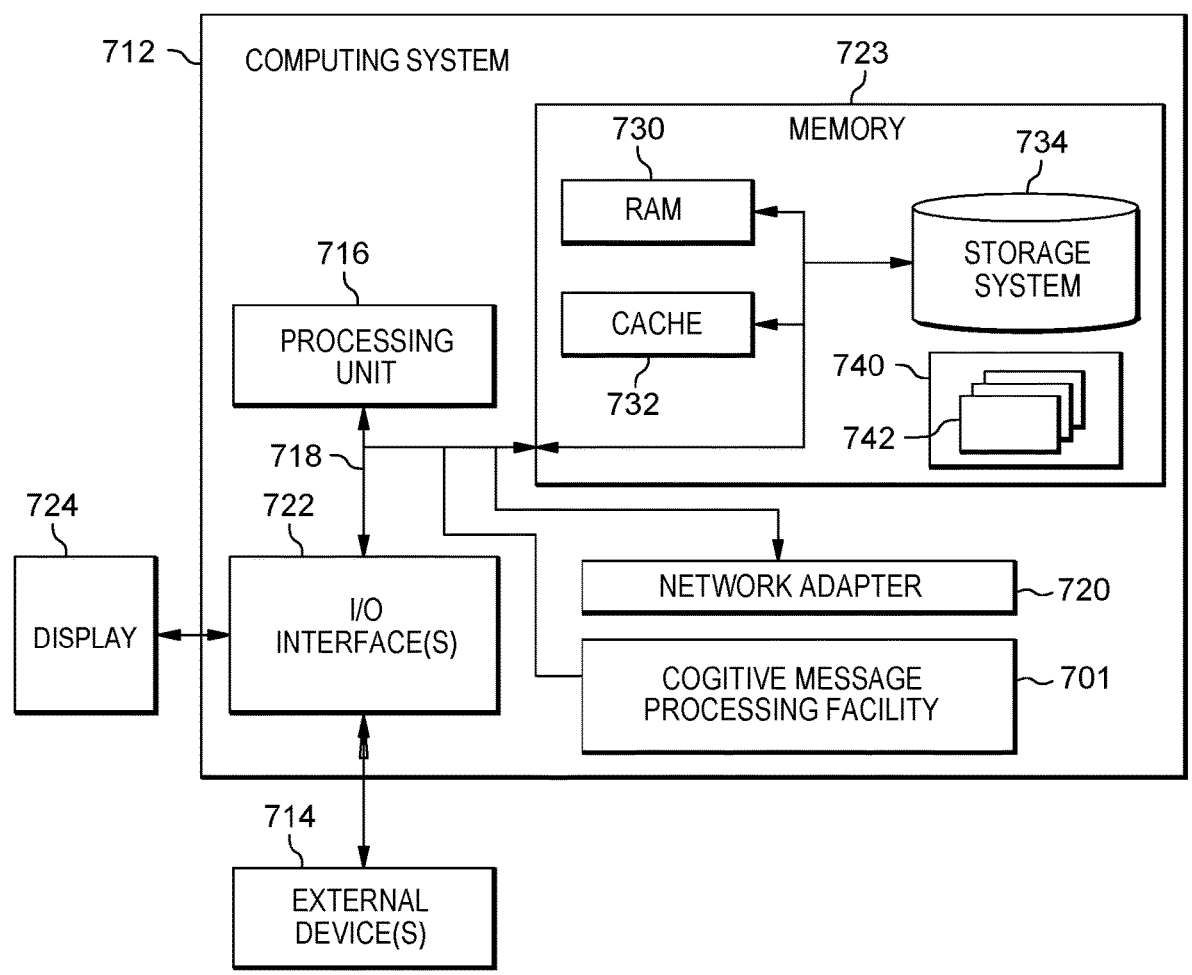
FIG. 7 depicts one embodiment of a computing system which can implement or facilitate implementing a cognitive message processing facility with activity-based relevance processing of an electronic message(s), in accordance with one or more aspects of the present invention.

As understood by one skilled in the art, program code, as referred to throughout this application, includes both software and hardware. For example, program code in certain embodiments of the present invention includes fixed function hardware, while other embodiments utilize a software-based implementation of the functionality described. Certain embodiments combine both types of program code. One example of program code, also referred to as one or more programs, is depicted in FIG. 7 as program/utility 740, having a set (at least one) of program modules 742, which can be stored in memory 723.

As noted, automated electronic messages can be generated and provided to a large number of electronic devices by a variety of service providers. For instance, an individual user can register with a service provider to receive automatic electronic messages or notifications on a wide variety of subjects, such as sports, traffic conditions, online order status, workflow requests, etc. Notwithstanding that the user is registered to receive the automated electronic messages, there are times when the user does not need a particular notification since the user is already engaged with the subject of the electronic message itself. For instance, where the subject is a baseball game and the user is attending the baseball game, it is superfluous information for the user's electronic device to receive automated electronic notifications with updates on the score of the baseball game. Thus, the state of the art is advanced herein by providing a cognitive, activity-related relevance processing of an electronic message, such as an automated electronic message or notification, being sent to a user's electronic device in order to reduce or eliminate superfluous notifications, and thereby provide a smart electronic notification approach.

In one or more embodiments, the processing eliminates, or at least modifies, superfluous electronic messages or communications based on the user's activity as it relates to the subject of the electronic message. As explained herein, a cognitive message processing facility with activity-related relevance processing of electronic messages can be located differently in different embodiments. For instance, the facility processing can be implemented by a service provider generating the automated electronic message, or by a service between the service provider of the automated electronic message and the end-user's or the subscriber's electronic device(s), or even at the user's electronic device itself, or a combination thereof.

Embodiments of the present invention include a computer-implemented method, a computer system, and a computer program product where program code executing on one or more processors provides activity-related relevance processing of one or more electronic messages for a registered user. Embodiments of the present invention include program code that processes an electronic message for an electronic device of the user, where the processing includes, for instance, determining whether to filter out or modify the electronic message for the user's electronic device based on a determined activity-related relevance of the message to the user.

More particularly, embodiments of the present invention embody a cognitive messaging processing facility where one or more processors receive user-related data indicative of a current activity of a registered user. In some embodiments of the present invention, the program code receives data from sensors proximate to the user, including, for instance, the user's electronics device, as well as (for example) Internet-of-Things (IoT) devices near the user. The types of sensors can also include, but not be limited to, image and sound capture devices (e.g., cameras, microphones), and motion and/or location detection devices (e.g., gyroscope(s), GPS devices), etc.

In one or more embodiments, the cognitive message processing facility program code receives an automated electronic message to be communicated, in part, to an electronic device of a user who has also registered for, opted in to, consented to, etc., activity-related relevance processing of electronic messages, as disclosed herein. For instance, in some embodiments of the present invention, the user pre-registers to utilize the functionality of cognitive message processing facility program code to monitor the user's activity, and as part of the registering, provides permission for the program code to access the individual's electronic device(s), IoT device(s) and/or other available devices, sensors, systems, etc., in order to obtain the user-related data. Note that as used herein, the user who has pre-registered for, or opted in to, activity-related relevance processing of electronic messages (as disclosed herein) is referred to as a registered user of the cognitive message processing facility, or registered user of the facility, or simply a registered user.

In some embodiments, the cognitive message processing facility is configured to parse the electronic message using, for instance, natural language processing to ascertain content (and context) of the message.

Further, embodiments of the present invention include determining by the cognitive message processing facility program code an activity-related relevance of the electronic message to the user based on the user-related data and the parsed content and context of the electronic message, and based at least in part on the determined activity-related relevance, processing the electronic message for the user's electronic device. In one or more embodiments, determining by the program code the activity-related relevance includes generating a confidence level that the content of the electronic message is superfluous information to the user based on the user's activity. For instance, where the subject of the electronic message is a baseball game, and the user-related data indicates that the user is attending the baseball game, then the confidence level is high where the subject of the electronic message is general information about the baseball game, such as a score of the baseball game. One or more factors or characteristics of the user-related data can be used by the cognitive message processing facility to ascertain a confidence level that the content or subject of the electronic message is superfluous to the user based on the user's current activity.

In one or more embodiments, processing the electronic message for the user's electronic device based on determined activity-related relevance can include determining whether to filter out or modify the electronic message for the user's electronic device. For instance, in one or more embodiments, the cognitive message processing facility program code processes the electronic message for the user's electronic device by filtering out the electronic message from the user's electronic device where, based on the user's current activity and the parsed content of the electronic message, the electronic message is superfluous to the user. This filtering out of the electronic message can include, for instance, blocking the electronic message from being received at the user's electronic device, or modifying a routing of the electronic message so that the electronic message is not directed to the user's electronic device.

In one or more embodiments, the cognitive message processing facility program code processes the electronic message for the user's electronic device based on determining that an ascertained confidence level for the activity-related relevance exceeds a confidence threshold. The processing can include determining whether to filter out or modify the electronic message for the user's electronic device. In one embodiment, the program code processes the electronic message for the user's electronic device by determining that the content of the electronic message is superfluous information related to the user's current activity, and based thereon, filters out or deletes the electronic message from the user's electronic device. In a further embodiment, the program code processes the electronic message for the user's electronic device by determining that the content of the electronic message is related but non-superfluous information relative to the user's current activity, and based thereon, provides the electronic message to the user's electronic device without modification.

In one or more embodiments, the program code of the cognitive message processing facility allows the user to configure the processing of the electronic message for the user's electronic device by setting the processing to, for instance, filter out the electronic message based on the confidence level exceeding the confidence threshold, or modify the electronic message based on the confidence level exceeding the confidence threshold. By way of example, modifying the electronic message can include truncating the content of the electronic message for display on the user's electronic device where the confidence level is at or above the confidence threshold. Further, note that the confidence threshold itself can be configurable by a user, where desired.

Thus, embodiments of the present invention include program code executing on one or more processors that: receives user-related data indicative of a current activity of a registered user; parses content of an automated electronic message or notification for an electronic device of the user using natural language processing of the message; determines an activity-related relevance of the electronic message to the user based on the user-related data and the parsed content of the message; and based at least in part on the determined activity-related relevance, processes the electronic message for the user's electronic device.

Aspects of various embodiments of the present invention are inextricably tied to computing and provide significant advantages over existing approaches to communicating electronic messages, such as automated electronic messages or notifications subscribed to by a user on one or more subjects or directed to a user, based on a user action or request. For instance, embodiments of the present invention enable program code executing on one or more processors to exploit interconnectivity of various systems, as well as utilize various computing-centric data analysis and handling techniques, in order to cognitively process an electronic message based on determined activity-related relevance of the message to a current activity of a registered user. Both the interconnectivity of the computing systems utilized and the computer-exclusive data processing techniques utilized by the program code enable various aspects of the present invention. Computerized monitoring analysis techniques are utilized by the program code to obtain user-related data indicative of a current activity of a user, as well as to parse content and context of the electronic message, rendering embodiments of the present invention inextricably tied to computing.

Further, embodiments of the present invention provide advantages over existing techniques for communicating electronic messages, for instance, to a user or subscriber, by smart processing the electronic message for the user based on determined activity-related relevance of the message to the user. For instance, where the electronic message concerns an activity with which the user is currently engaged, the electronic message can be filtered out from the user's electronic device where the message is considered superfluous information to the user. In this manner, the registered user is free from receiving unnecessary automated electronic message.

Figure 1:
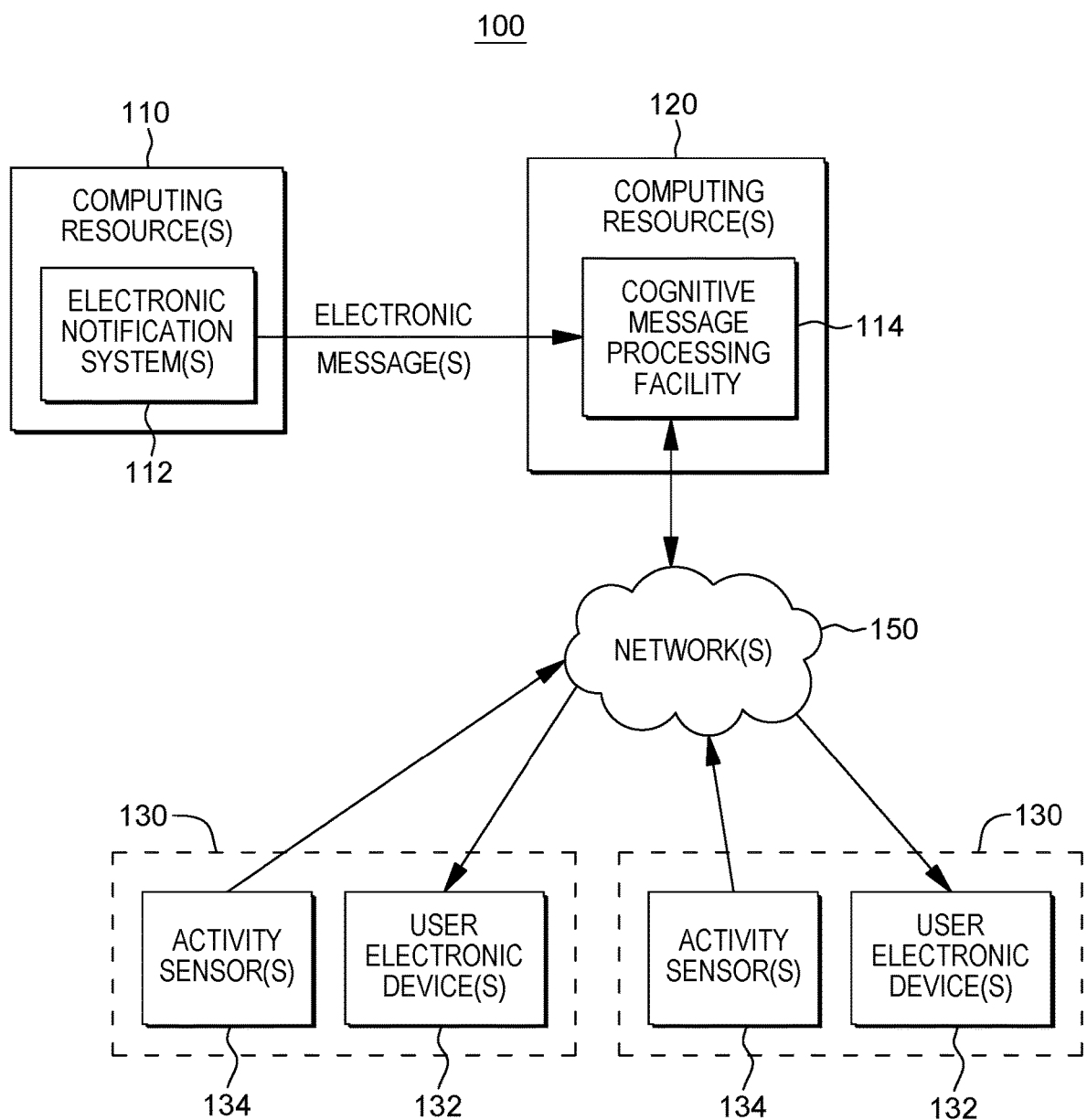
FIG. 1 is an illustration of a technical environment into which various aspects of an embodiment of a cognitive message processing facility can be implemented, in accordance with one or more aspects of the present invention.

FIG. 1 depicts one embodiment of an environment 100 into which various aspects of some embodiments of the present invention can be implemented or integrated. Environment 100 includes computing devices, including one or more computing resources 110 which execute program code implementing one or more electronic notification systems 112. Electronic notification systems 112 generate electronic messages for automatic distribution to electronic devices of one or more registered users (or subscribers) of the electronic notification system (or service).

For illustrative purposes only, one or more other computing resources 120 are also shown with program code implementing a cognitive message processing facility 114, in accordance with one or more aspects disclosed herein. This is a non-limiting example of an implementation, and cognitive message processing facility 114 and electronic notification system 112 could alternatively share one or more computing resources. In one or more other embodiments, cognitive message processing facility 114 could be located elsewhere within environment 100. For instance, in one embodiment, one or more aspects could be integrated with electronic notification system 112 and/or distributed, such as on one or more electronic devices 132 of one or more registered users.

As noted, cognitive message processing facility 114 implements, in one or more embodiments, activity-related relevance processing of electronic messages for a registered user of the facility. The cognitive message processing facility processes an electronic message for the user's electronic device based, at least in part, on a determined activity-related relevance of the message to the user's current activity. For instance, the processing can include determining whether to filter out the electronic message or modify an aspect of the electronic message, for the user's electronic device. In order to determine activity-related relevance of the message, the cognitive message processing facility 114 receives user-related data from one or more user electronic devices 132 and/or one or more activity sensors 134 associated with or in proximity to a registered user, such as within a space 130 where the registered user is located at the time of processing the electronic message. Additionally, any further monitoring device or system (not shown) associated with or capable of providing information on the current activity of the registered user can be utilized to provide user-related data to cognitive message processing facility 114. By way of example, activity sensor(s) 134 can include smart sensors, such as activity tracking devices, as well as Internet-of-Things (IoT) devices. As understood by one skilled in the art, the Internet-of-Things (IoT) is a system of interrelated computing devices, mechanical and digital machines, and objects that can be provided with unique identifiers and the ability to transfer data over a network without requiring human-to-human or human-to-computer interaction. These communications can be enabled by the smart sensors, which can include, but are not limited to, both active and passive radio-frequency identification (RFID) tags, which utilize electromagnetic fields to identify automatically and to track tags associated with objects and/or people. Smart sensors, such as RFID tags, can assist in determining current activity of a registered user as the activity potentially relates to or overlaps with the subject of an electronic message. Internet-of-Things devices can also include individual activity and fitness trackers, which typically include devices or applications that include smart sensors for monitoring and/or tracking activity metrics. Thus, in some embodiments of the present invention, cognitive message processing facility 114 executing on the one or more computing resources 120 utilizes (with permission of the user) smart sensor(s) 134, as well as potentially the user's electronic device(s) 132, and other devices or systems, to obtain user-related data indicative of the current activity of the user to ascertain whether the user's activity relates to or overlaps with the subject of an electronic message generated, for instance, by electronic notification system 112. Note in this regard that the number and types of sensors, devices, systems, etc., generating the user-related data depends, in part, on the activity with which the registered user is currently engaged at the time of processing the electronic message for the user's electronic device, as will be readily understood from the examples provided.

The user's electronic device(s) 132 can be any of a variety of electronic devices registered to receive, for instance, automatically generated electronic messages or notifications from a service provider. For instance, user electronic device(s) 132 can be a mobile device, a smartphone, a tablet computer, a laptop computer, a personal digital assistant (PDA), a wireless computer, a desktop computer, a server, a vehicle navigation system, a gaming device, etc.

One or more networks 150 communicatively couple, for instance, computing resource(s) 120 hosting cognitive message processing facility 114 and user electronic device(s) 132 and sensor(s) 134. Although not shown, computing resource(s) 110 can also communicatively couple to computing resource(s) 120 via network(s) 150, or a different network. By way of example only, network 150 can be or include a telecommunications network, a local-area network (LAN), a wide-area network (WAN), such as the Internet, or a combination thereof, and can include wired, wireless, fiber optic connections, etc. The network can include one or more wired and/or wireless networks that are capable of receiving and transmitting data, including audio and/or video signals or data, depending on the implementation.

Figure 2:
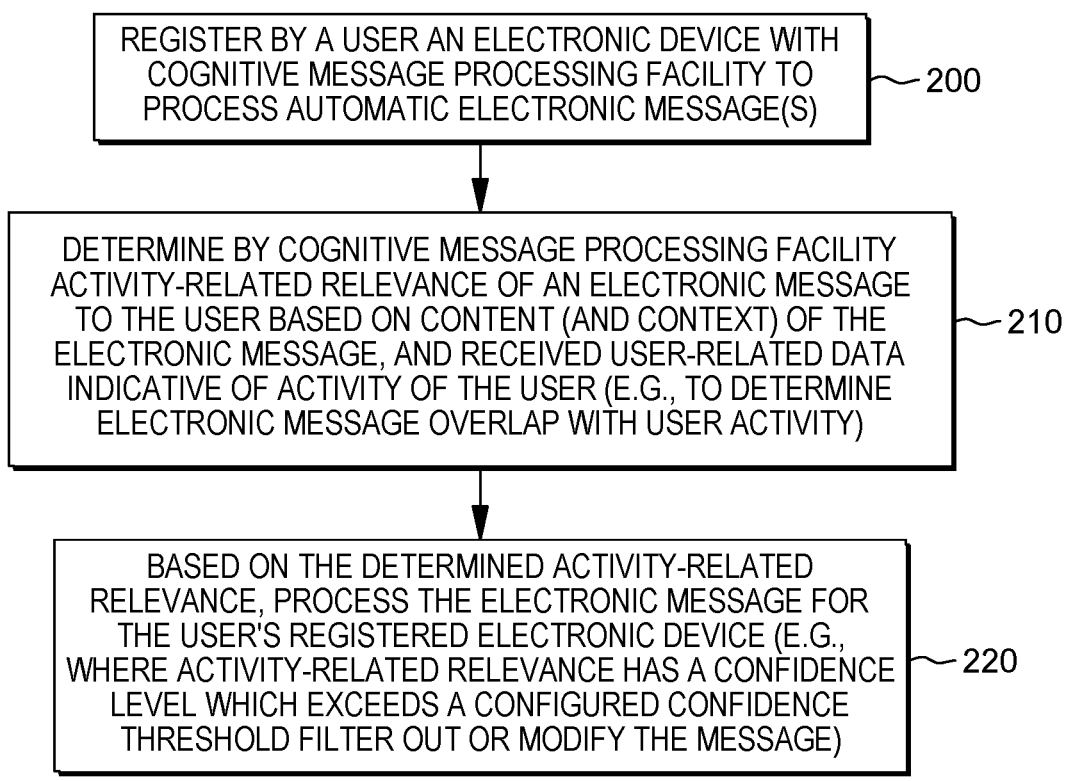
FIG. 2 depicts one embodiment of activity-related relevance processing of an electronic message implemented by a cognitive message processing facility, in accordance with one or more aspects of the present invention.

FIG. 2 depicts one embodiment of activity-related relevance processing of an electronic message implemented by program code of a cognitive message processing facility, in accordance with one or more aspects of the present invention.

As illustrated, in one or more embodiments of the present invention, a user opts-in or registers with the cognitive message processing facility for the processing disclosed herein. Also, the user registers one or more user electronic devices for which automated electronic messages 200 are to be processed and/or from which user-related data can be received. As part of this registration, the user can also identify and authorize access to one or more activity sensors or other systems (e.g., audio and/or video monitoring systems) owned by or proximate to the user to provide the cognitive message processing facility with user-related data for evaluating overlap between the subject of an electronic message and the user's current activity (including location where applicable) at time of message processing.

In one or more embodiments, program code of the cognitive message processing facility determines activity-related relevance of an electronic message to the user based on content (and context) of the electronic message, and the received user-related data indicative of the current activity of the user 210. As noted, the activity-related relevance is used to determine whether there is overlap between the electronic message content and the user's activity such that the message is superfluous information to the user.

In one or more embodiments, determining an activity-related relevance of an electronic message to the user involves ascertaining a confidence level that the content of the electronic message is superfluous or redundant information to the user based on the user's current activity. For instance, where the electronic message relates to an electronic application, the facility checks to determine whether the user is actively engaged with the content of the electronic message within the electronic application. In another example, location of the user, for instance, at a ball game, or at home watching a ball game on television, can be used to determine the activity-related relevance of the electronic message to the user where, for instance, the content of the message is general information about the ball game. A variety of factors or attributes can be considered in generating a confidence level that the content of the electronic message is already known to the user at any given time. For instance, the user-related data can include the location of the user at time of processing the electronic message, and the activity or actions being performed by the user, for instance, driving a vehicle versus sitting at a desk before a computer screen. Depending on the subject of the electronic message, user proximity to the subject can guarantee that the user is aware of the content of the message. If proximity to the subject does not guarantee that the content is already known to the user, then the confidence level can be lowered. This determination by the cognitive message processing facility can be assisted, in part, by natural language processing of the content and context of the electronic message to determine, for instance, whether the source of the electronic message is from the event at which the user is attending, or from a third party source regarding the event. Other examples are discussed further below.

In some embodiments of the present invention, the program code executing on the one or more resources implementing the cognitive message processing facility utilize existing cognitive analysis tools or agents to determine the activity-related relevance. Embodiments of the present invention can utilize a variety of existing cognitive agents, as well as existing APIs, to ascertain an activity-related relevance of an electronic message. Some embodiments of the present invention utilize IBM Watson® as the cognitive agent. IBM Watson® is a product of International Business Machines Corporation, and is a registered trademark of International Business Machines Corporation, Armonk, N.Y., USA. Note that this is a non-limiting example of a cognitive agent that can be utilized in embodiments of the present invention, and is discuss for illustrative purposes, only, and not to imply, implicitly or explicitly, any limitations regarding cognitive agents that can implement aspects of embodiments of the present invention.

In some embodiments of the present invention that utilize IBM Watson® as a cognitive agent, the program code interfaces with IBM Watson® APIs to perform a cognitive analysis of the received user-related data, as well as an analysis of the content and context of the electronic message. In some embodiments of the present invention, the program code interfaces with the Application Program Interfaces (APIs) that are part of a known cognitive agent, such as the IBM Watson® application program interface (API), a product of International Business Machines Corporation, to determine a current activity of the user. Further, embodiments of the present invention that utilize IBM Watson® may utilize APIs that are not part of IBM Watson® to accomplish these aspects.

As noted, in one or more embodiments, program code implementing the cognitive message processing facility also parses content and context of the electronic message using natural language processing (NLP). Specifically, in some embodiments of the present invention, certain of the APIs of IBM Watson® API include a cognitive agent that includes one or more programs including, but not limited to, natural language processing, natural language classifiers, Retrieve and Rank (a service available through the IBM Watson® developer cloud that can surface the most relevant information), concepts/visual insights, trade-off analytics, text conversion, and/or relationship extraction. In an embodiment of the present invention, one or more program products analyze content and context of the electronic message to determine whether there is overlap with the user's current activity. Note that various other APIs and third-party solutions can also provide the above-noted functionality in embodiments of the present invention.

Continuing with FIG. 2, based on the determined activity-related relevance, program code of the cognitive message processing facility processes the electronic message for the user's registered electronic device(s) 220. Processing the electronic message includes, for instance, determining whether to filter out or block the electronic message from the user's electronic device or to modify an aspect of the electronic message for the user's electronic device. In one or more implementations, the program code processes the electronic message for the user's registered electronic device where the activity-related relevance has a confidence level that exceeds a configured confidence threshold, which can be specifically set or configured by the registered user, and can vary depending, for instance, on the amount of electronic message filtering desired by the user.

Figure 3:
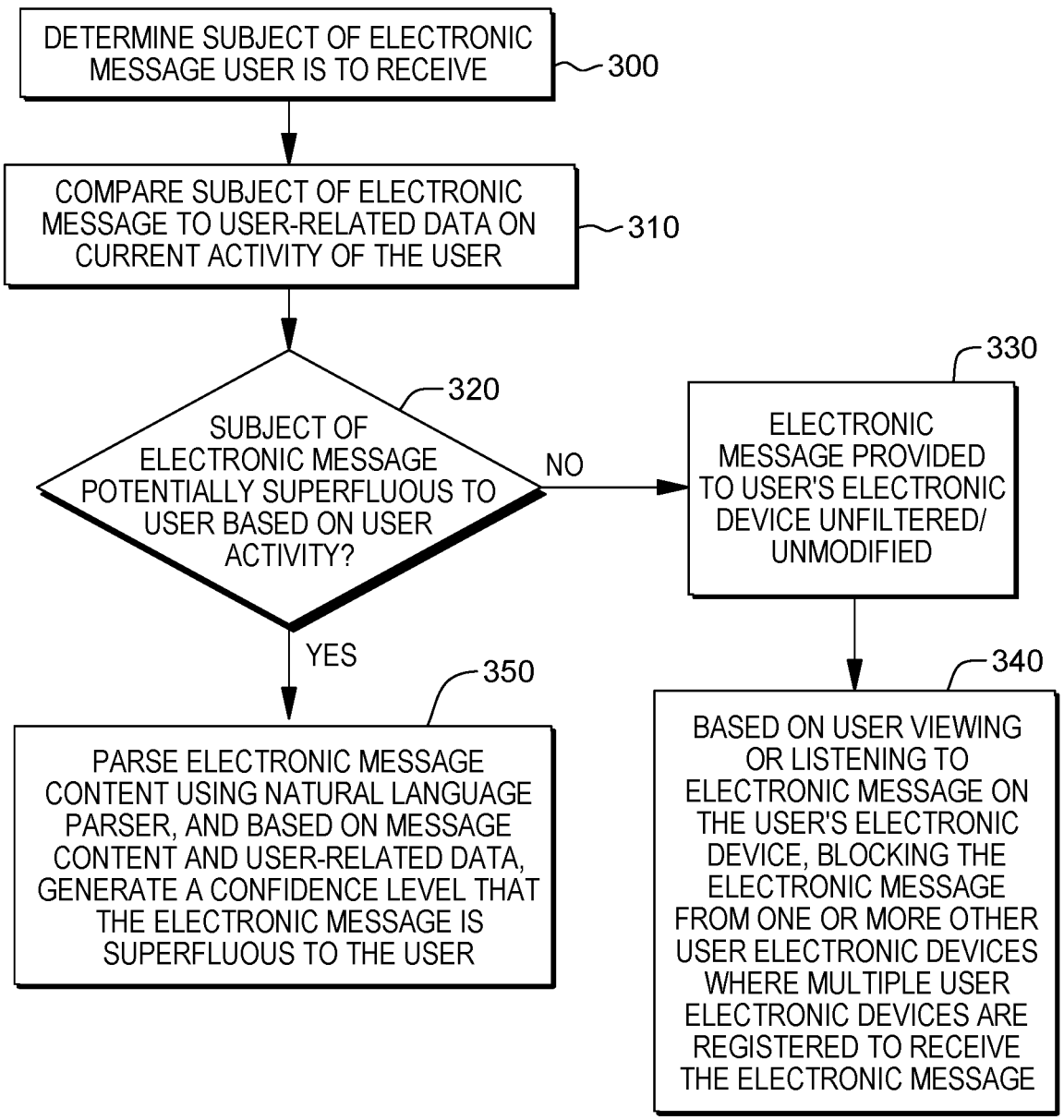
FIG. 3 depicts one embodiment of determining by a cognitive message processing facility activity-related relevance of an electronic message to a user, in accordance with one or more aspects of the present invention.
Figure 4A:
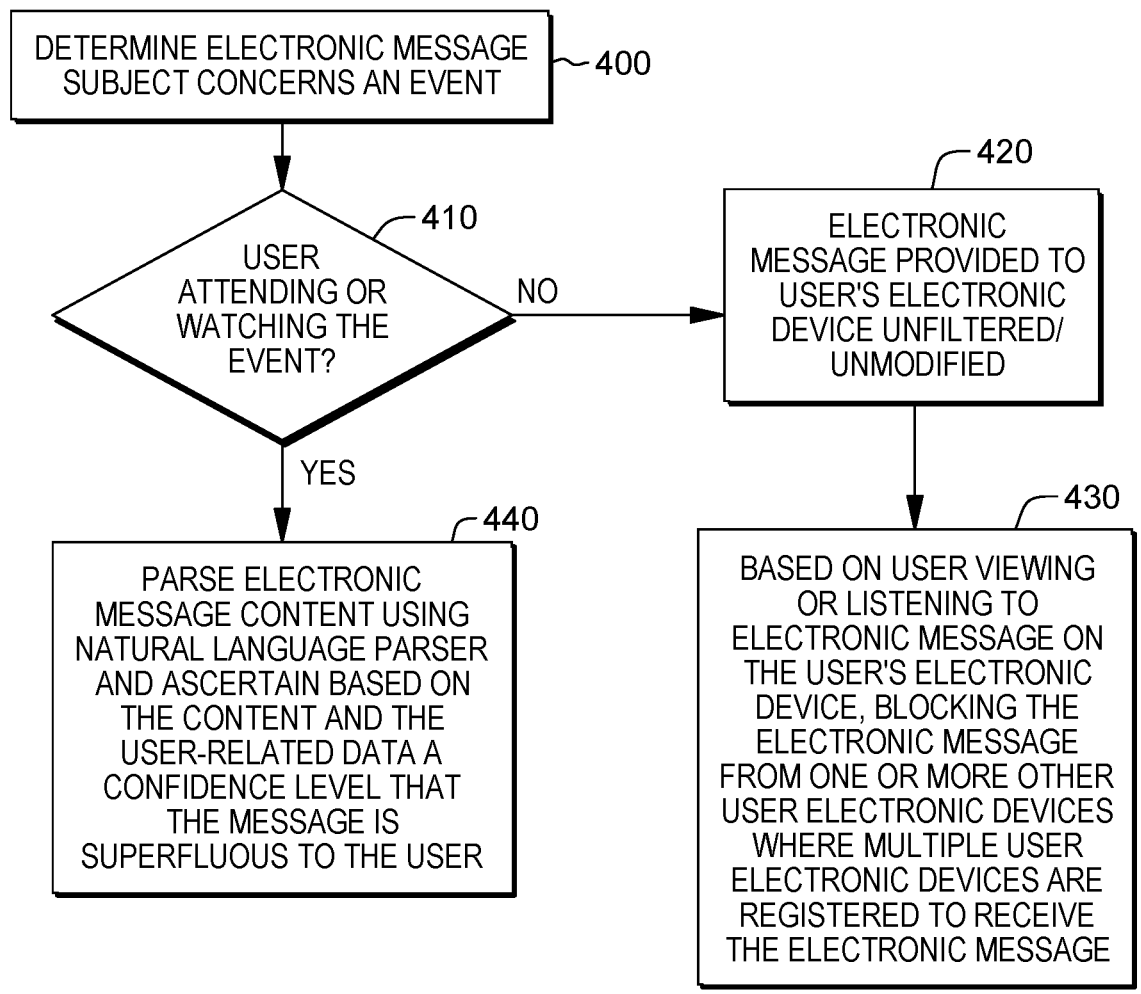
FIG. 4A depicts an example of determining activity-related relevance to a user of an electronic message relating to an event, in accordance with one or more aspects of the present invention.
Figure 4B:
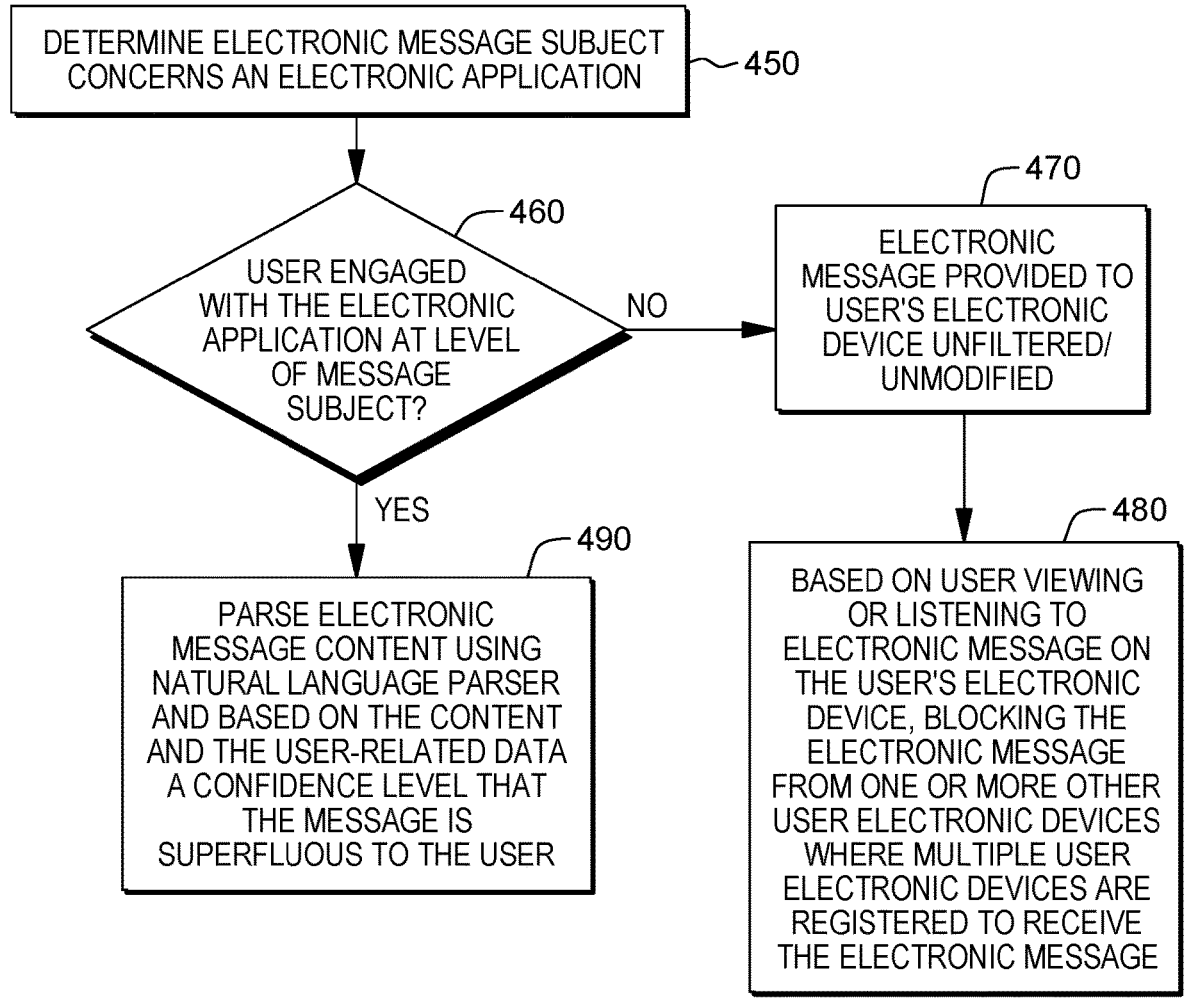
FIG. 4B depicts an example of determining activity-related relevance to a user of an electronic message concerning an electronic application, in accordance with one or more aspects of the present invention.

By way of further explanation, FIG. 3 depicts one embodiment of determining, by program code of a cognitive message processing facility, activity-relating relevance of an electronic message to a user. As illustrated in one embodiment, the program code determines the subject of an electronic message a registered user is to receive 300. For instance, program code determines whether the automated electronic message relates to a sports score, traffic information, order status, an electronic application, etc., which the user is to receive. In one embodiment, program code compares the subject of the electronic message to user-related data indicative of the current activity of the registered user 310. The program code determines whether the subject of the electronic message potentially is superfluous information to the user based on the user activity 320. For instance, where the automated electronic message subject involves a work-related electronic application, and the user is attending a ball game, then the electronic message is passed, for instance, for display on the user's electronic device unfiltered and/or unmodified 330. Further, in one or more implementations, based on the user viewing or listening to the electronic message on the user's electronic device, the program code blocks the electronic message from one or more other user electronic devices where multiple user electronic devices are registered to receive the electronic message 340. For instance, where the electronic message concerns a school closure, and the user has registered multiple electronic devices to receive an automated school closing notification, then once the user has viewed or listened to the electronic message on one user's electronic device(s), the cognitive message processing facility blocks the electronic message from one or more other registered electronic devices of that user. Otherwise, where the subject of the electronic message is potentially superfluous information to the user based on the user's activity, then in one or more embodiments, program code of the cognitive message processing facility parses the electronic message content and context using a natural language parser, and based on the message content and context, as well as the user-related data, generates a confidence level that the electronic message content is superfluous information to the user based on the user's activity 350. FIGS. 4A & 4B depict examples of this program code processing.

Referring to FIG. 4A, in one or more embodiments, program code of the cognitive processing message facility determines an electronic message subject concerns an event, such as a baseball game 400. The program code is configured to determine whether the user's current activity involves the event, for instance, is the user attending the event or watching the event 410? If "no", then the program code allows the electronic message to be provided to the user's electronic device unfiltered/unmodified, for instance, for display or listening to on the user's electronic device 420. As noted with respect to FIG. 3, based on the user viewing or listening to the electronic message on the user's electronic device, the cognitive message processing facility code can be configured to block the electronic message from one or more other user electronic devices where the user has registered multiple electronic devices to receive the electronic message 430. Based on the user attending or watching the event, the electronic message content and context are parsed using a natural language parser, and the program code ascertains, based on the content (and context), and the user-related data, a confidence level that the message is superfluous information to the user 440. For instance, program code can determine if the user is at an event using Global Positioning System (GPS) information, audio and/or video analysis, or could determine that the user is watching an event by receiving user-related data regarding, for instance, a television channel being watched via the user's registered mobile device(s), or another registered device, sensor, system, etc., for the user. In another embodiment, audio analysis of a conversation the registered user is having with another individual could be provided as user-related data to allow the program code to know that the user is talking about the event that is the subject of the electronic message.

Using the activity sensor(s) and user's electronic device(s), as well as other systems and devices in proximity to the user, different types of user-related data can be generated with different strength factors affecting the confidence level that the user is engaged with the event. For instance, GPS data may place the user's electronic device within the stadium of the baseball game. As such, the confidence level is high that the user is attending the baseball game. If the user's current activity, for instance, proximity to an event, does not guarantee that the content is already known by the user, then the confidence factor is lowered. For instance, the user may be at a baseball game and know that a player has been injured, but does not known the extent of the injury. In this case, the confidence level that the electronic message content is superfluous is lower. In one or more embodiments, the confidence level can be quantized on a numerical scale, for instance, of zero to ten, with different weights being assigned to different user-related data types. Further, the cognitive message processing facility can learn over time how best to weight different types of user-related data relative to the subject of an electronic message for determining whether the electronic message is superfluous information to the registered user.

In one or more embodiments, the cognitive message processing facility program code can utilize a neural network to analyze the collected data relative to the user's current activity in comparison to the subject of the electronic message to generate a confidence level that the registered user is aware of the content of the message, and thus that the message is superfluous information to the user. Neural networks are a programming paradigm which enable a computer to learn from observational data, in this case, sensor or device data, as well as other system data relevant to a determination of the user's current activity in relation to the subject of the electronic message. This learning is referred to as deep learning, which is a set of techniques for learning in neural networks. Neural networks, including modular neural networks, are capable of pattern (e.g., state) recognition with speed, accuracy, and efficiency, in situations where data sets are multiple and expansive, including across a distributed network, including but not limited to, a cloud computing system. Modern neural networks are non-linear statistical data modeling tools. They are usually used to model complex relationships between inputs and outputs, or to identify patterns (e.g., states) in data (i.e., neural networks are non-linear statistical data modeling or decision making tools). In general, the cognitive message processing facility program code can utilize neural networks to identify a confidence level from the received user-related data and the parsed electronic message content and context as to whether the message is superfluous information to the user. Because of the speed and efficiency of neural networks, especially when parsing multiple complex data sets, neural networks and deep learning provide solutions to many problems in multiple-source processing, which program code in embodiments of the present invention can utilize when obtaining and comparing data to determine whether the message is superfluous for a particular user based on the user's current activity.

FIG. 4B depicts an example of program code logic for a cognitive message processing facility determining activity-related relevance to a user of an electronic message concerning an electronic application, such as a work-related transaction. As illustrated, in one embodiment, program code determines the electronic message subject concerns an electronic application, such as a workplace program or issue 450. The program code determines whether the user is engaged with the electronic application at the level of the subject message 460. If "no", then the electronic message is provided to the user's electronic device unfiltered/unmodified, for instance, for display or playing 470. For instance, where the electronic message is an update on the status of a help desk transaction regarding a workplace program, and the registered user is currently attending a ball game, then the user's activity does not overlap with the electronic application at the level of the message subject, and no processing of the electronic message is performed, with the electronic message being passed, for instance, to the user's electronic device unfiltered and unmodified by the facility. As noted above, the cognitive message processing facility program code can further be configured to block the electronic message from one or more other user electronic devices based on the user viewing or listening to the electronic message on the user electronic device, that is, where the user has registered multiple electronic devices to receive the electronic message 480. If the user is engaged with the electronic application at the level of the electronic message subject (e.g., the user has the help desk window open on a device in the above example), then the electronic message content and context are parsed using a natural language parser, and based on the content and context of the message, and the received user-related data, a confidence level that the message is superfluous to the user is ascertained 490. This confidence level evaluation can be similar to that described above in connection with the process of FIG. 4A.

As noted, in one or more embodiments, the cognitive message processing facility program code determines if the registered user is engaged with the electronic application at the level of the subject of the electronic message. For instance, in the example of FIG. 4B, if the registered user is engaged with a transaction of an electronic application in the workplace, for instance, is reading and/or editing the transaction, which relates to the subject of the electronic message, then the confidence level is high that the registered user's activity overlaps with the content of the electronic message, meaning that the automated electronic message is likely superfluous to the user. As with the example of FIG. 4A, different types of user-related data can be weighted differently in determining the confidence level, and the cognitive message processing facility can learn over time using deep learning processes how to accurately indicate a confidence level that the message is superfluous information to the user based on the user's current activity.

Figure 5A:
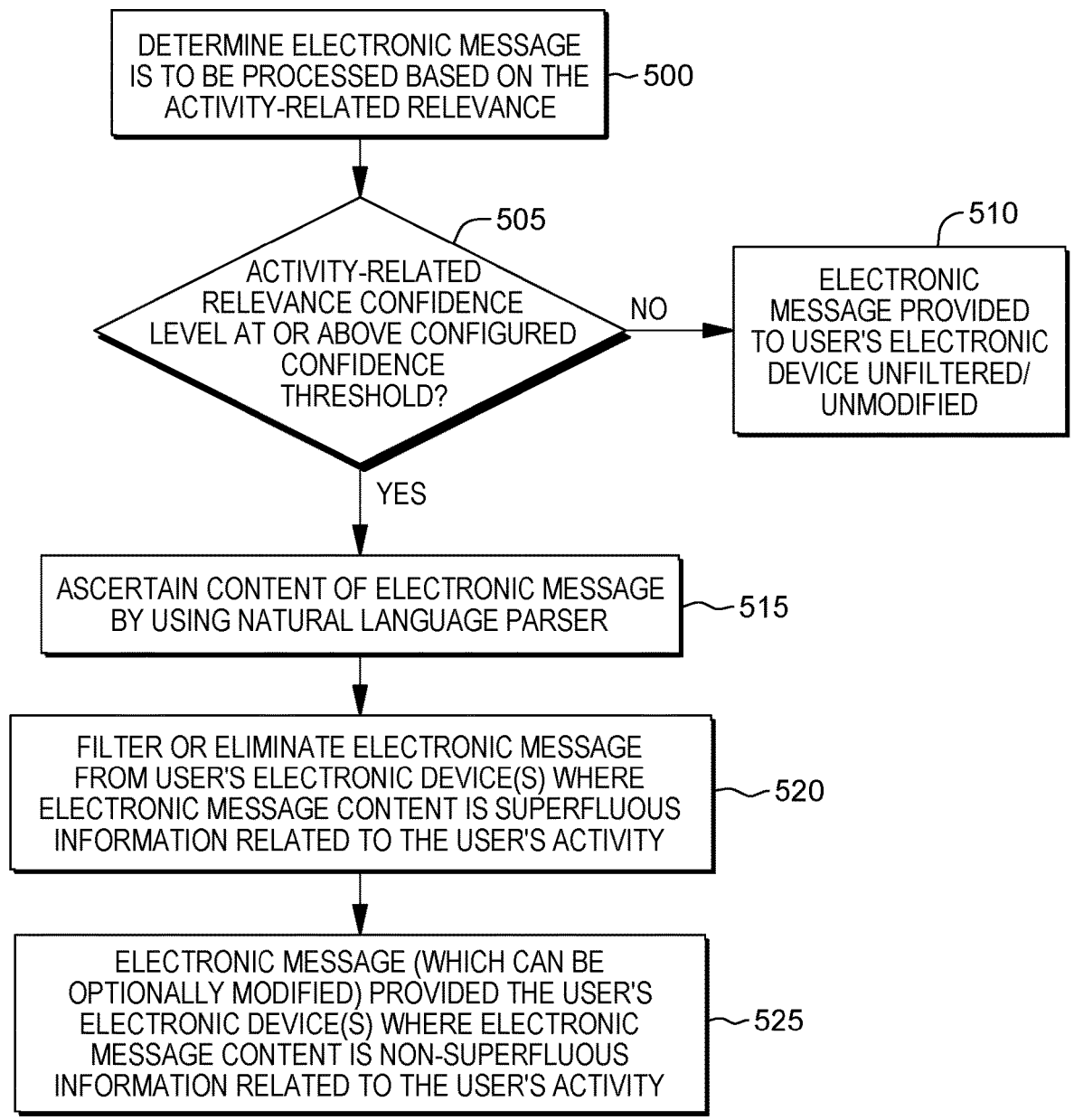
FIG. 5A depicts one embodiment of processing an electronic message pursuant to the determined activity-related relevance, in accordance with one or more aspects of the present invention.

FIG. 5A depicts one embodiment of facility program code processing an electronic message pursuant to the determined activity-related relevance. As illustrated, program code determines whether the electronic message is to be processed based on the activity-related relevance 500. In one or more embodiments, this includes determining whether the activity-related relevance confidence level is at or above a configured confidence threshold 505. If "no", then the electronic message is provided to the user's electronic device, for instance, unfiltered and unmodified 510. Based on the activity-related confidence level being at or above the configured confidence threshold, the facility program code ascertains content of the electronic message using natural language processing 515. Where content and context of the electronic message has already been parsed via the natural language parser, the parsed information is referenced by the program code. In the illustrated embodiment, the facility program code filters or eliminates electronic messages from the user's electronic device where the electronic message content is superfluous information related to the user's current activity 520. In particular, content of the electronic message is analyzed by the cognitive message processing facility to determine whether the content is considered superfluous in relation to the user's current activity. For instance, if the user is attending a ball game, then an automated electronic message which provides an update on the score of the ball game that the user is attending, constitutes superfluous information which is filtered or eliminated from being displayed on the user's electronic device. In one or more embodiments, this can involve removing the user's registered electronic device from a routing list indicating the registered user is otherwise to receive the automated electronic message.

Further, processing the electronic message can include passing the electronic message onto the user's electronic device for display where the cognitive message processing facility determines that the electronic message content is non-superfluous information related to the user's activity. For instance, in the ball game example, the registered user attending the ball game may know that a player has been injured, but does not know the extent of the injury, which could be the subject of the electronic message. In that case, the content is non-superfluous information and the automated electronic message is passed on (with or without modification) to the user's electronic device 525. By way of example, the automated electronic message can be modified by the cognitive message processing facility where the message contains both superfluous information and non-superfluous information, with the modification being to delete the superfluous information prior to passing the electronic message to the user's electronic device.

Where the electronic message is provided to the user's electronic device, with or without modification, then as noted, in the case where the user has registered multiple electronic devices to receive an automated electronic message, the cognitive message processing facility program code can further be configured to block the electronic message from one or more other user electronic devices, that is, based on the user viewing or listening to the electronic message on one of the user's registered electronic devices.

Figure 5B:
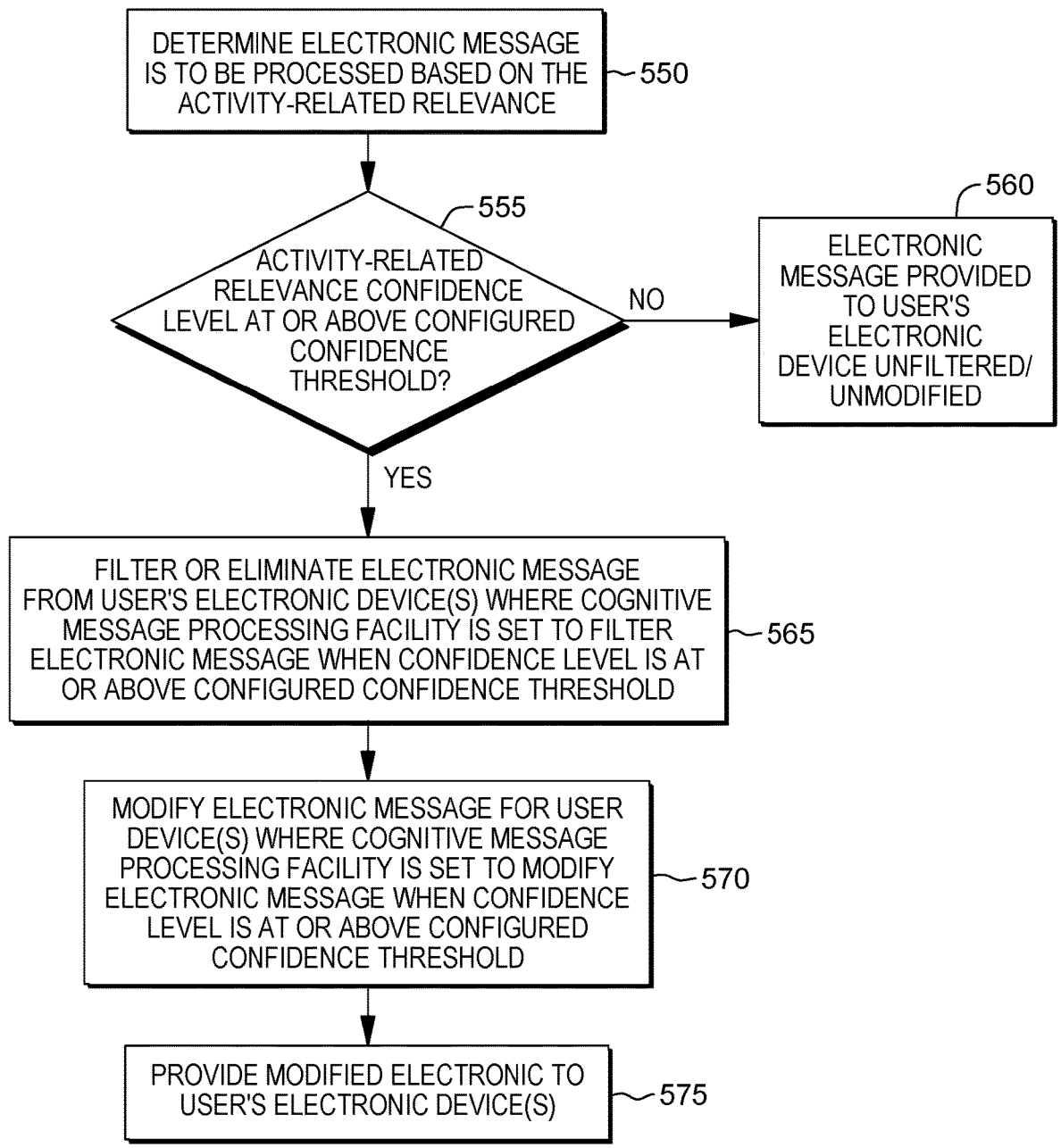
FIG. 5B depicts another embodiment of processing an electronic message pursuant to the determined activity-related relevance, in accordance with one or more aspects of the present invention.

FIG. 5B depicts another embodiment of facility program code processing of an electronic message pursuant to the determined activity-related relevance. As illustrated, program code determines whether the electronic message is to be processed based on the activity-related relevance 550. In one or more embodiments, this includes determining whether the activity-related relevance confidence level is at or above a configured confidence threshold 555. If "no", then the electronic message is provided to the user's electronic device, for instance, unfiltered and unmodified 560. Based on the activity-related confidence level being at or above the configured confidence threshold, then, in this embodiment, the facility program code filters or eliminates the electronic message from the user's electronic device(s) where the cognitive message processing facility is set to filter the electronic message when the confidence level is at or above the configured confidence threshold 565. In one or more embodiments, the cognitive message processing facility can be configured to allow the user to set, for instance, at the time of registration with the facility, the program code to filter out the electronic message whenever the confidence level is at or above the configured confidence threshold. In one or more embodiments, the configured confidence threshold is also user-configurable. In this manner, the user is able to affect the amount of automated electronic message filtering provided by the cognitive message processing facility for the user's registered electronic device(s).

In one or more embodiments, the facility program code modifies the electronic message for the user's electronic device(s) where the cognitive message processing facility is set to modify the electronic message when the confidence level is at or above the configured confidence threshold 570, after which the modified electronic message is provided to the user's electronic device(s) 575. For instance, a truncated version of the electronic message content can be provided to the user's electronic device(s) when the cognitive message processing facility is set to modify the electronic message wherever the confidence level is at or above the configured confidence threshold. As noted, in one or more embodiments, the cognitive message processing facility can be configured to be set by the user at the time of registering with the facility whether to, for instance, filter out an electronic message or modify (e.g., truncate) and provide an electronic message whenever the confidence level is at or above the configured confidence threshold.

In one or more implementations, the cognitive message processing facility can be implemented as or provide a callable service or process disposed between, for instance, an electronic notification system and one or more electronic devices of one or more registered users. In one embodiment, the cognitive message processing facility is configured to filter out superfluous or gratuitous information from being received at the user's electronic device, and in particular, automated electronic messages or notifications that contain superfluous information to the user based, in part, on the user's current activity. The filtering out of the electronic message can include, for instance, modifying a distribution list for the electronic message to remove the user's electronic device(s) from the distribution list for that particular automated electronic message. In one or more embodiments, the cognitive message processing facility is an opt-in-only system, where the user registers with the system, and also registers one or more available devices, sensors, systems, etc., which can be used to capture and provide user-related data indicative of the current activity of the user at the time of processing a generated electronic message.

As described, in one or more embodiments, the cognitive message processing facility determines relevance of the content of the electronic message to the user based on the user's current activity. Relevance can be determined based on content of the electronic message and the user-related data. For instance, where the electronic message is embedded in an electronic application, the cognitive message processing facility determines whether the user is currently logged in and/or engaged with the electronic application, and therefore likely to already know the information contained in the electronic message. Further, where the electronic message involves an event, the cognitive message processing facility determines, via the user-related data, whether the registered user is engaged with the event, for instance, attending the event, or watching the event remotely. In this case, the user-related data could include location-based data, for instance, Global Positioning System (GPS) data, channel-related data, or video/audio analysis of the user's current activity to generate a confidence level or factor that the content of the electronic message is already known to the user. Where proximity of the user's activity to an event does not guarantee that the information in the electronic message is already known by the user, the confidence level can be lowered. This determination can be based on natural language processing of the electronic message content and context.

In one or more embodiments, where the confidence level is above the confidence threshold, the user's electronic device(s) routing information is removed from the distribution or routing list for that particular electronic message and/or a modified or secondary version of the electronic message, such as a truncated version, can be substituted and forwarded to the user's electronic device(s). As noted, the registered user can, in one or more embodiments, control the confidence level desired, through the confidence threshold, based on the volume of automated electronic messages the user wishes to selectively remove.

Advantageously, disclosed herein are a computer-implemented method, a computer system, and computer program products which filter out, or modify an automated electronic message to a registered user already engaged with the subject of the electronic message, such that the content of the electronic message is superfluous information to the user. The cognitive message processing facility can additionally eliminate electronic messages from one or more user-registered electronic devices where the electronic message has been confirmed received by the user through another channel, for instance, through a different user-registered electronic device. The cognitive message processing facility can be used with a variety of automated electronic messages or notifications, including in association with electronic notification systems that push sporting updates, order status updates, traffic condition updates, etc.

Further details of one embodiment of facilitating processing within a computing environment, as relating to one or more aspects of the present invention, are described with reference to FIGS. 6A-6B.

Referring to FIG. 6A, in one embodiment, a method is provided which includes receiving, by one or more processors, user-related data indicative of a current activity of a user (600), and parsing, by the one or more processors, content of an electronic message for an electronic device of the user, where the parsing uses natural language processing of the electronic message (602). An activity-related relevance of the electronic message to the user based on the user-related data and the parsed content of the electronic message is determined by the one or more processors (604). Based at least in part on the determined activity-related relevance, the electronic message is processed for the user's electronic device (606).

In one or more implementations, the processing of the electronic message includes determining whether to filter out the electronic message for the user's electronic device(s) or modify the electronic message for the user's electronic device(s) based on the activity-related relevance (608). In one or more embodiments, the electronic message is, or includes, an automated electronic notification, and the user is registered to receive the automated electronic notification on the user's electronic device(s) (610).

In one or more implementations, the processing of the electronic message for the user's electronic device(s) includes filtering out the electronic message from the user's electronic device(s) where, based on the user-related data indicative of the user's current activity, and the parsed content of the electronic message, the electronic message is considered superfluous information to the user (612). In one embodiment, filtering out the electronic message from the user's electronic device(s) includes modifying a routing list for the electronic message so that the user's electronic device(s) does not receive the electronic message (614).

Referring to FIG. 6B, in one or more implementations, determining the activity-related relevance of the electronic message includes generating a confidence level that the content of the electronic message is superfluous to the user based on the user-related data indicative of the user's current activity, and determining whether the generated confidence level exceeds a confidence threshold (616). In one embodiment, based on the confidence level exceeding the confidence threshold, the processing of the electronic message for the user's electronic device(s) further includes determining that the content of the electronic message is superfluous information related to the user activity, and based thereon, the processing the electronic message includes filtering out of the electronic message from the user's electronic device(s) (618).

In one implementation, based on the confidence level exceeding the confidence threshold, the processing of the electronic message for the user's electronic device(s) further includes determining that the content of the electronic message is non-superfluous to the user's current activity, and based thereon, the processing of the electronic message includes providing the electronic message to the user's electronic device(s) unmodified (620). In one embodiment, based on the confidence level exceeding the confidence threshold, the processing of the electronic message for the user's electronic device(s) further includes determining that the content of the electronic message is related and non-superfluous information to the user's current activity, and based thereon, the processing of the electronic message includes modifying the electronic message and providing the modified electronic message to the user's electronic device(s) (622).

In one or more implementations, the method further includes allowing the user to preconfigure the processing of the electronic message for the user's electronic device(s) by setting the processing to filter out the electronic message based on the confidence level exceeding a confidence threshold, or to modify the electronic message based on the confidence level exceeding the confidence threshold, with the modifying including truncating the content of the electronic message for display on the user's electronic device(s) (624).

Further exemplary embodiments of a computing environment to implement one or more aspects of the present invention are described below with reference to FIGS. 7-9.

By way of further example, FIG. 7 depicts one embodiment of a computing environment 700, which includes a computing system 712. Examples of well-known computing systems, environments, and/or configurations that may be suitable for use with computer system 712 include, but are not limited to, a server, a desktop computer, a work station, a wireless computer, a handheld or laptop computer or device, a mobile phone, a programmable consumer electronic device, a tablet, a personal digital assistant (PDA), and the like.

Computing system 712 can be described in the general context of computer system-executable instructions, such as program modules, being executed by a computer system. Generally, program modules include routines, programs, objects, components, logic, data structures, and so on that perform particular tasks or implement particular abstract data types.

As depicted in FIG. 7, computing system 712, is shown in the form of a general-purpose computing device. The components of computing system 712 can include, but are not limited to, one or more processors or processing units 716, a system memory 723, and a bus 718 that couples various system components including system memory 723 to processor 716.

In one embodiment, processor 716 may be based on the z/Architecture® offered by International Business Machines Corporation, or other architectures offered by International Business Machines Corporation or other companies.

Bus 718 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing system 712 can include a variety of computer system readable media. Such media may be any available media that is accessible by computing system 712, and it includes both volatile and non-volatile media, removable and non-removable media.

System memory 723 can include computer system readable media in the form of volatile memory, such as random access memory (RAM) 730 and/or cache memory 732. Computing system 712 can further include other removable/non-removable, volatile/non-volatile computer system storage media. By way of example only, storage system 734 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media could be provided. In such instances, each can be connected to bus 718 by one or more data media interfaces. As described below, memory 723 can include at least one program product having a set (e.g., at least one) of program modules or code that are configured to carry out the functions of embodiments of the invention.

Program/utility 740, having a set (at least one) of program modules 742, can be stored in memory 732 by way of example, and not limitation, as well as an operating system, one or more application programs, other program modules, and program data. Each of the operating system, one or more application programs, other program modules, and program data or some combination thereof, can include an implementation of a networking environment. Program modules 742 generally carry out the functions and/or methodologies of embodiments of the invention as described herein. Alternatively, a cognitive message processing facility, module, logic, etc., 701 can be provided within computing environment 712 implementing activity-related relevance processing of an electronic message, as disclosed herein.

Computing system 712 can also communicate with one or more external devices 714 such as a keyboard, a pointing device, a display 724, etc.; one or more devices that enable a user to interact with computing system 712; and/or any devices (e.g., network card, modem, etc.) that enable computing system 712 to communicate with one or more other computing devices. Such communication can occur via Input/Output (I/O) interfaces 722. Still yet, computing system 712 can communicate with one or more networks such as a local area network (LAN), a general wide area network (WAN), and/or a public network (e.g., the Internet) via network adapter 720. As depicted, network adapter 720 communicates with the other components of computing system, 712, via bus 718. It should be understood that although not shown, other hardware and/or software components could be used in conjunction with computing system 712. Examples, include, but are not limited to: microcode, device drivers, redundant processing units, external disk drive arrays, RAID systems, tape drives, and data archival storage systems, etc.

One or more aspects may relate to or use cloud computing.

It is understood in advance that although this disclosure includes a detailed description on cloud computing, implementation of certain teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

A cloud computing node can include a computer system/server, such as the one depicted in FIG. 7. Computer system/server 712 of FIG. 7 can be practiced in distributed cloud computing environments where tasks are performed by remote processing devices that are linked through a communications network. In a distributed cloud computing environment, program modules may be located in both local and remote computer system storage media including memory storage devices. Computer system/server 712 is capable of being implemented and/or performing any of the functionality set forth hereinabove.

Figure 8:
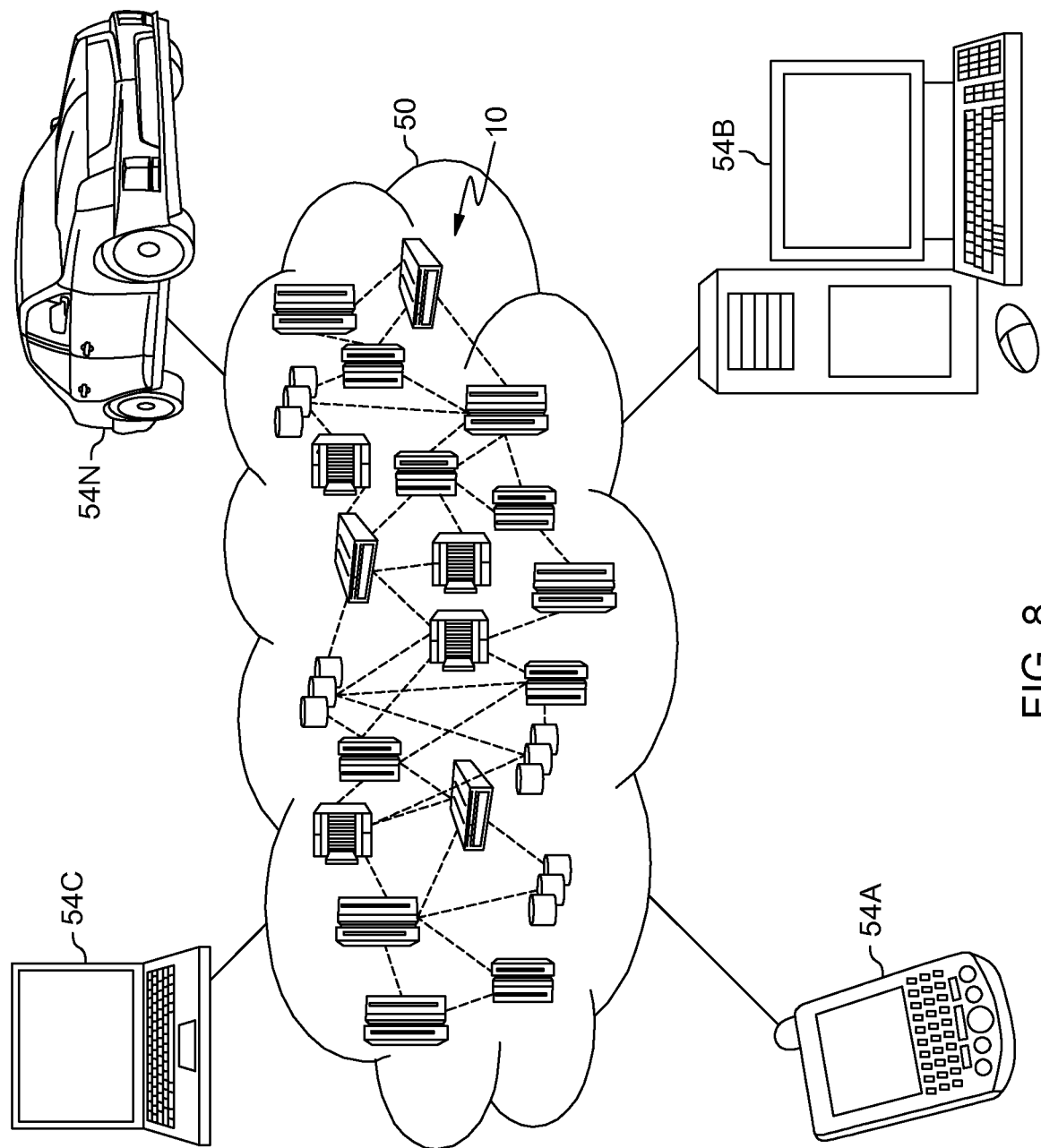
FIG. 8 depicts one embodiment of a cloud computing environment which can facilitate implementing, or be used in association with, one or more aspects of the present invention.

Referring now to FIG. 8, illustrative cloud computing environment 50 is depicted. As shown, cloud computing environment 50 can comprise one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 9:
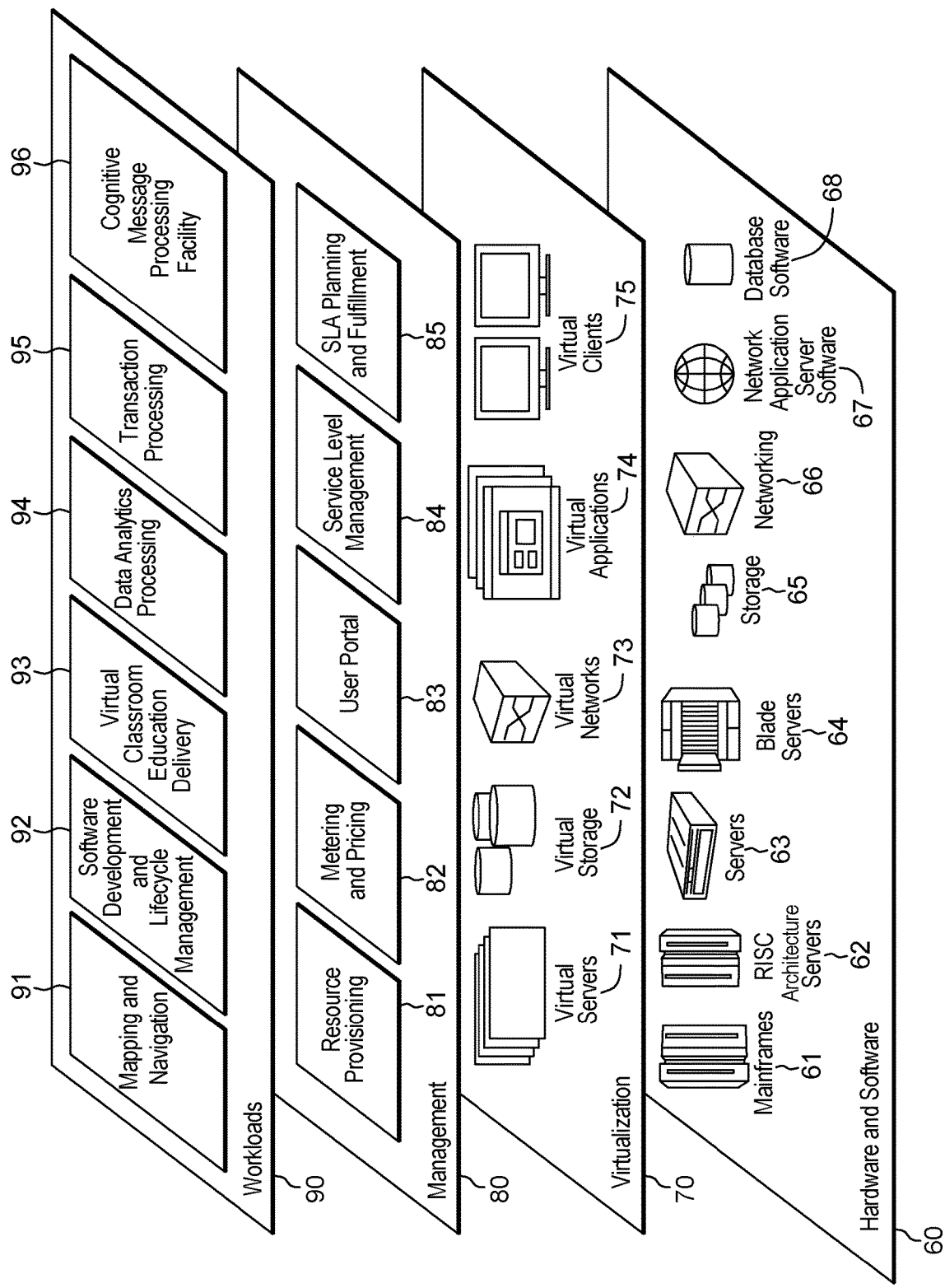
FIG. 9 depicts an example of abstraction model layers, which can facilitate implementing a cognitive message processing facility with activity-related relevance processing of an electronic message(s), in accordance with one or more aspects of the present invention.

Referring to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a cognitive message processing facility 96.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different instructions, instruction formats, instruction fields and/or instruction values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of one or more aspects of the invention and the practical application, and to enable others of ordinary skill in the art to understand one or more aspects of the invention for various embodiments with various modifications as are suited to the particular use contemplated.

What is claimed is:

1. A computer-implemented method of a cognitive message processing facility, comprising:
    registering an electronic device of a user with the cognitive message processing facility to process electronic messages, the registering including configuring by the user a confidence threshold above which an electronic message is to be considered redundant to the user based on a current activity of the user;
    based on the registering, receiving, by one or more processors, user-related data indicative of a current activity of the user;
    parsing, by the one or more processors, content of an electronic message for an electronic device of the user, the parsing using natural language processing of the electronic message;
    determining, by the one or more processors, an activity-related relevance of the electronic message to the user based on the user-related data indicative of the current activity of the user and the parsed content of the electronic message, the determined activity-related relevance indicating whether the electronic message is considered redundant to the user based on the current activity of the user, the determining comprising:
        generating a confidence level that the content of the electronic message is redundant to the user based on the user-related data indicative of the user's current activity;
        determining whether the confidence level exceeds the user-configured confidence threshold; and
        based on the confidence level exceeding the user-configured confidence threshold, determining that the content of the electronic message is redundant information related to the user's current activity, otherwise determining that the content of the electronic message is non-redundant information to the user's current activity; and
    based at least in part on the determined activity-related relevance indicating whether the electronic message is redundant to the current activity of the user, processing the electronic message for the user's electronic device.

2. The computer-implemented method of claim 1, wherein processing the electronic message includes determining whether to filter out the electronic message for the user's electronic device based on the activity-related relevance, or modify the electronic message for the user's electronic device based on the activity-related relevance.

3. The computer-implemented method of claim 2, wherein the electronic message comprises an automated electronic notification, and the user is registered to receive the automated electronic notification on the user's electronic device.

4. The computer-implemented method of claim 2, wherein processing the electronic message for the user's electronic device comprises filtering out the electronic message from the user's electronic device where, based on the user-related data indicative of the user's current activity and the parsed content of the electronic message, the electronic message is considered redundant to the user based on the current activity of the user.

5. The computer-implemented method of claim 4, wherein filtering out the electronic message from the user's electronic device comprises modifying a routing list for the electronic message so that the user's electronic device does not receive the electronic message.

6. The computer-implemented method of claim 1, wherein based on the confidence level exceeding the confidence threshold, the processing the electronic message for the user's electronic device further comprises determining that the content of the electronic message is redundant information related to the user's current activity, and based thereon, the processing the electronic message comprises filtering out the electronic message from the user's electronic device.

7. The computer-implemented method of claim 6, wherein based on the confidence level not exceeding the confidence threshold, the processing the electronic message for the user's electronic device further comprises providing, at least in part, the electronic message to the user's electronic device.

8. The computer-implemented method of claim 1, further comprising modifying the electronic message based on the confidence level exceeding the confidence threshold, the modifying comprising truncating the content of the electronic message for the user's electronic device.

9. A computer system comprising:
a memory; and
one or more processors in communication with the memory, wherein the computer system is configured to perform a method of a cognitive message processing facility, comprising:
registering an electronic device of a user with the cognitive message processing facility to process electronic messages, the registering including configuring by the user a confidence threshold above which an electronic message is to be considered redundant to the user based on a current activity of the user;
based on the registering, receiving, by the one or more processors, user-related data indicative of a current activity of the user;
parsing, by the one or more processors, content of an electronic message for an electronic device of the user, the parsing using natural language processing of the electronic message;
determining, by the one or more processors, an activity-related relevance of the electronic message to the user based on the user-related data indicative of the current activity of the user and the parsed content of the electronic message, the determined activity-related relevance indicating whether the electronic message is considered redundant to the user based on the current activity of the user, the determining comprising:
generating a confidence level that the content of the electronic message is redundant to the user based on the user-related data indicative of the user's current activity;
determining whether the confidence level exceeds the user-configured confidence threshold; and
based on the confidence level exceeding the user-configured confidence threshold, determining that the content of the electronic message is redundant information related to the user's current activity, otherwise determining that the content of the electronic message is non-redundant information to the user's current activity; and
based at least in part on the determined activity-related relevance indicating whether the electronic message is redundant to the current activity of the user, processing the electronic message for the user's electronic device.

10. The computer system of claim 9, wherein processing the electronic message includes determining whether to filter out the electronic message for the user's electronic device based on the activity-related relevance, or modify the electronic message for the user's electronic device based on the activity-related relevance.

11. The computer system of claim 10, wherein the electronic message comprises an automated electronic notification, and the user is registered to receive the automated electronic notification on the user's electronic device.

12. The computer system of claim 10, wherein processing the electronic message for the user's electronic device comprises filtering out the electronic message from the user's electronic device where, based on the user-related data indicative of the user's current activity and the parsed content of the electronic message, the electronic message is considered redundant to the user based on the current activity of the user.

13. The computer system of claim 9, wherein based on the confidence level exceeding the confidence threshold, the processing the electronic message for the user's electronic device further comprises filtering out the electronic message from the user's electronic device.

14. The computer system of claim 13, wherein based on the confidence level not exceeding the confidence threshold, the processing the electronic message for the user's electronic device further comprises providing, at least in part, the electronic message to the user's electronic device for display.

15. A computer program product comprising:
a computer-readable storage medium readable by one or more processors and storing instructions for execution by the one or more processors for performing a method of a cognitive message processing facility, comprising:
registering an electronic device of a user with the cognitive message processing facility to process electronic messages, the registering including configuring by the user a confidence threshold above which an electronic message is to be considered redundant to the user based on a current activity of the user;
based on the registering, receiving, by the one or more processors, user-related data indicative of current activity of the user;
parsing, by the one or more processors, content of an electronic message for an electronic device of the user, the parsing using natural language processing of the electronic message;
determining, by the one or more processors, an activity-related relevance of the electronic message to the user based on the user-related data indicative of the current activity of the user and the parsed content of the electronic message, the determined activity-related relevance indicating whether the electronic message is considered redundant to the user based on the current activity of the user, the determining comprising:
generating a confidence level that the content of the electronic message is redundant to the user based on the user-related data indicative of the user's current activity;
determining whether the confidence level exceeds the user-configured confidence threshold; and
based on the confidence level exceeding the user-configured confidence threshold, determining that the content of the electronic message is redundant information related to the user's current activity, otherwise determining that the content of the electronic message is non-redundant information to the user's current activity; and
based at least in part on the determined activity-related relevance indicating whether the electronic message is redundant to the current activity of the user, processing the electronic message for the user's electronic device.

16. The computer program product of claim 15, wherein processing the electronic message includes determining whether to filter out the electronic message for the user's electronic device based on the activity-related relevance, or modify the electronic message for the user's electronic device based on the activity-related relevance, and wherein the electronic message comprises an automated electronic notification, and the user is registered to receive the automated electronic notification on the user's electronic device.

17. The computer program product of claim 16, wherein processing the electronic message for the user's electronic device comprises filtering out the electronic message from the user's electronic device where, based on the user's current activity and the parsed content of the electronic message, the electronic message is considered redundant to the user based on the current activity of the user.

\* \* \* \* \*